United States Patent
Baskaran

(10) Patent No.: US 9,015,483 B2
(45) Date of Patent: Apr. 21, 2015

(54) METHOD AND SYSTEM FOR SECURED DATA STORAGE AND SHARING OVER CLOUD BASED NETWORK

(71) Applicant: Prakash Baskaran, Ashburn, VA (US)

(72) Inventor: Prakash Baskaran, Ashburn, VA (US)

( * ) Notice: Subject to any disclaimer, the term of this patent is extended or adjusted under 35 U.S.C. 154(b) by 83 days.

(21) Appl. No.: 13/732,258

(22) Filed: Dec. 31, 2012

(65) Prior Publication Data
US 2014/0189352 A1 Jul. 3, 2014

(51) Int. Cl.
*H04L 29/00* (2006.01)
*H04L 29/06* (2006.01)
*G06F 9/00* (2006.01)
*G06F 17/30* (2006.01)
*H04L 29/08* (2006.01)

(52) U.S. Cl.
CPC ............ *H04L 63/0428* (2013.01); *H04L 67/06* (2013.01); *H04L 67/1097* (2013.01); *G06F 9/00* (2013.01); *G06F 17/30* (2013.01)

(58) Field of Classification Search
CPC . H04L 63/0428; H04L 67/06; H04L 67/1097; G06F 9/00; G06F 17/30
USPC ........................................ 713/168; 726/28, 1
See application file for complete search history.

(56) References Cited

U.S. PATENT DOCUMENTS

| | | | | |
|---|---|---|---|---|
| 2010/0146269 | A1* | 6/2010 | Baskaran ..................... | 713/165 |
| 2011/0022642 | A1* | 1/2011 | deMilo et al. ................ | 707/805 |
| 2011/0208958 | A1* | 8/2011 | Stuedi et al. ................. | 713/150 |
| 2014/0019498 | A1* | 1/2014 | Cidon et al. ................. | 707/827 |
| 2014/0130117 | A1* | 5/2014 | Jeannot ........................... | 726/1 |

OTHER PUBLICATIONS box Box.net End User Guide, 2011, pp. 1-20.*

* cited by examiner

*Primary Examiner* — Michael Pyzocha
(74) *Attorney, Agent, or Firm* — Barry Choobin; Patent 360 LLC

(57) ABSTRACT

The various embodiments herein provide a method and system for secure data storage and sharing over a cloud based network. The method comprises installing a client application on a user device, authenticating a client application user, extracting content from a data source, obtaining content sharing information from a content storage provider, sending a content distribution list and a content usage policy to an application server, encrypting the content by the client application, creating and sharing a secure content file, decrypting the content file, finding the content usage policy and sharing information from the content file, obtaining an updated content usage policy from the application server, authenticating the content recipient using an authentication mechanism, verifying the identity of the content recipient using an identity resolution mechanism, rendering the secure content file to the recipient, enforcing the content usage policy and sending content usage logs to the application server.

6 Claims, 2 Drawing Sheets

METHOD AND SYSTEM FOR SECURED DATA STORAGE AND SHARING OVER CLOUD BASED NETWORK

BACKGROUND

1. Technical Field

The embodiments herein generally relate to file sharing systems and methods and particularly relates to securing data files stored and shared over a cloud based network. The embodiments herein more particularly relate to secure data shared over cloud with life time control on the shared data.

2. Description of the Related Art

Data sharing is the practice of making data available for others to reuse the data. Now a days data sharing among the people or among organizations is unavoidable to make the business, for scholarly research, entertainment and many other purposes.

The security of shared data has always been a difficult task. In known systems, users are often limited to just sharing out the data. However security of shared data is a big issue in personal applications as well as industries.

To protect data, one type of security procedure involves encrypting the data, so that even if the data falls into the wrong hands, it cannot be read without a key. Many application level programs provide some form of such encryption. Subsequently, the files maintained in the shared directory may be encrypted.

However, even the foregoing typical cryptographic systems are still highly reliant on keys externally managed by the user for security.

Further in case of cloud storage systems, data security may depend on encryption provided by cloud storage provider or explicitly managed by the user. Sharing of data is complicated by the fact that it is difficult to manage data file security because, the user may not be able to access the data, recall the data and control the data usage once data leaves the storage (cloud or device) after sharing.

Currently there is no single solution available to secure and protect shared data within or outside the storage. And also no technique exists to control the data once the content is delivered to the intended recipient.

Hence, there is a need for an improved method and system which provides secured data storage and data sharing over cloud. There is also a need for a method and system which provides for data security even after the data file exit the storage. Further there is need for a method and system which enables a user to control the data file even after sharing. Moreover, there is a need for a method and system for securing data shared through mobile devices, emails/FTP and cloud storage.

The abovementioned shortcomings, disadvantages and problems are addressed herein and which will be understood by reading and studying the following specification.

OBJECTS OF THE EMBODIMENTS

The primary object of the embodiments herein is to provide a method and system for secure storage and sharing of data over a cloud based network through automated encryption.

Another object of the embodiments herein is to provide a method and system for providing security for data stored in content storage on the cloud or in the user's device.

Another object of the embodiments herein is to provide a method and system for providing security for data that is shared.

Another object of the embodiments herein is to provide a method and system which extends data security even after the shared data exits storage.

Another object of the embodiments herein is to provide a method and system for providing persistent data control on cloud storage.

Another object of the embodiments herein is to provide a method and system for data sharing which enables a user to revoke access or expire the shared data.

Another object of the embodiments herein is to provide a method and system which enables users to share data with intended recipients with control over the shared data even after the data exits the storage Another object of the embodiment is to provide a method and system of data sharing which uses multiple authentication mechanisms including standard authentication mechanisms of the content storage provider.

Another object of the embodiment is to provide a system for identifying the intended recipient by an identity, verifiable through a distribution list and an identity resolution mechanism.

Another object of the embodiments herein is to provide the users with an ability to track, monitor and dynamically control shared data usage.

These and other objects and advantages of the embodiment herein will become readily apparent from the following summary and the detailed description taken in conjunction with the accompanying drawings.

SUMMARY

The various embodiments herein provide a method and system for secure data storage and sharing over a cloud based network. The method comprises installing a client application on a user device, authenticating a client application user, extracting a content from a content storage provider, obtaining content sharing information from the content storage provider, sending a content distribution list and a content usage policy to an application server, encrypting the content by the client application, creating a secure content file, storing and sharing the secure content file over a network cloud storage, decrypting the content file, finding the content usage policy and sharing information from the content file, obtaining an updated content usage policy from the application server, authenticating content recipient using at least one of an authentication mechanism of the content storage provider and an authentication mechanism specified in the content usage policy, verifying the identity of the content recipient using an identity resolution mechanism, rendering the content file to the content recipient, enforcing the content usage policy and sending content usage logs to the application server.

According to an embodiment of the present disclosure, the method further comprises enforcing the content usage policy after the content file is retrieved from the content storage provider and enforcing an updated content usage policy on the content file after the content file is retrieved from the content storage provider when there is a change in the content file usage policy.

According to an embodiment of the present disclosure, the content is retrieved from a plurality of data sources to the client application for encrypting and sharing, where the plurality of data sources includes emails, pictures, content from messages and the like. The content is dragged or copied from the content storage provider to the client application for encrypting and sharing.

According to an embodiment of the present disclosure, the data sharing enables one click move to cloud storage of content files. Here the content is automatically encrypted without having a user to provide a password, a private key, a public key or a key store.

According to an embodiment of the present disclosure, the content is encrypted using at least one of an AES 256 encryption algorithm or other NSA Standard encryption algorithms.

According to an embodiment of the present disclosure, the data sharing is provided across file formats, application/platforms and other authentication sources according to the file usage policy.

According to an embodiment of the present disclosure, the content usage policy is defined and managed by a sender.

According to an embodiment of the present disclosure, the content file control feature is embedded with the content usage policy in the secure content file.

According to an embodiment of the present disclosure, the secure content file provides security for files stored or shared through the network cloud storage, security for files extracted or generated from applications, security for enterprise documents residing in BYOD (Bring Your Own Device) and security for SMS, voice mails, MMS from mobile devices or the like.

According to an embodiment of the present disclosure, the secure content file wraps digital content of any MIME type with layered encryption and with embedded policies controlling time, location and usage of the content.

Embodiments herein further provide a system for secure data storage and sharing over a cloud based network. The system comprises a content storage provider, a first communication device and a second communication device in communication with an application server, a content storage provided in the first communication device and a client application provided in the first communication device and the second communication device.

According to an embodiment of the present disclosure, the client application provided on the first communication device is adapted to extract content from the content storage, obtain content sharing information from the content storage provider, transmit a content distribution list and a content usage policy to the application server, encrypt the content and create a secure content file.

According to an embodiment of the present disclosure, the client application provided on the second communication device is adapted to decrypt the secure content file, find the content usage policy from the content file, find the content sharing information, obtain an updated content usage policy from the application server, authenticate the content recipient using at least one of an authentication mechanism of the content storage provider and an authentication mechanism specified in the content usage policy, verify the identity of the content recipient through the identity resolution mechanism, render the secure content file on the second communication device and enforce the file usage policy based on a time and a location.

According to an embodiment of the present disclosure, the first communication device is a sender device and the second communication device is a recipient device.

According to an embodiment of the present disclosure, the content storage comprises content extracted from at least one of online content storage provider, emails, pictures, content from messages and the like.

According to an embodiment of the present disclosure, the content storage provider is at least one of a device content storage or network cloud storage.

According to an embodiment herein, an intended content recipient in a distribution list is recognized by at least one of the verifiable identities such as an email address, a mobile phone number, an OAuth principal, an IMEI number, a device id and the like, verified through an identity resolution mechanism after authentication.

According to an embodiment herein, the authentication mechanism is at least one of the authentication mechanisms of a cloud storage provider or other supported authentication mechanisms as specified in the file usage policy.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
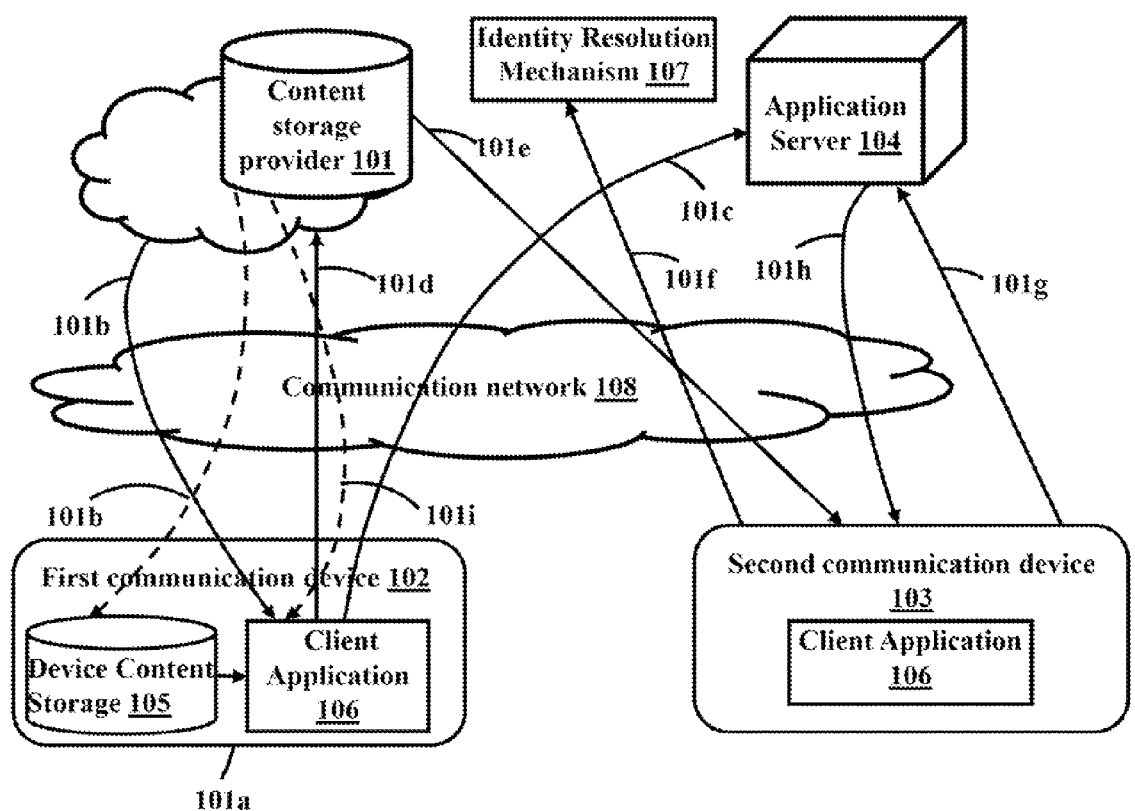
FIG. 1 is an environmental diagram illustrating a system for securing shared data over a cloud based network, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method for secure data storage and sharing over a cloud based network. The method comprises installing a client application on a user device, authenticating a client application user, extracting a content from a content storage provider, obtaining content sharing information from the content storage provider, sending a content distribution list of intended recipients and a content usage policy to an application server, encrypting the content by the client application, creating a secure content file, storing and sharing the secure content file over a network cloud storage, decrypting the content file, finding the content usage policy and sharing information from the content file, obtaining an updated content usage policy from the application server, authenticating a content recipient using at least one of an authentication mechanism of the content storage provider and an authentication mechanism specified in the content usage policy, verifying the identity of the content recipient through the identity resolution mechanism; rendering the content file to the content recipient, enforcing the content usage policy and sending content usage logs to the application server.

The content usage policy herein is enforced after the content file is retrieved from the content storage provider. Further, when there is a change in the content usage policy, the updated content usage policy on the content file is enforced after the content file is retrieved from the content storage provider.

The content is retrieved from a plurality of data sources to the client application for encrypting and sharing, where the plurality of data sources includes emails, pictures, content from messages and the like. The content is dragged from the content storage provider to the client application for encrypting and sharing.

The data sharing enables one click move to cloud storage of content files. Here the content is automatically encrypted without having a user to provide a password, a private key, a public key or a key store.

The content is encrypted using at least one of an AES 256 encryption algorithm or other NSA Standard encryption algorithms.

The data sharing is provided across file formats, application/platforms and other authentication sources according to the file usage policy. Here the content usage policy is defined and managed by a sender. Also the content file control feature is embedded with the content usage policy in the secure content file.

The secure content file provides security for files stored or shared through the network cloud storage, security for files extracted or generated from applications, security for enterprise documents residing in BYOD (Bring Your Own Device) and security for SMS, voice mails or MMS from mobile devices. The secure content file wraps digital content of any MIME type with layered encryption and with embedded policies controlling time, location and usage of the content. Embodiments herein further provide a system for secure data storage and sharing over a cloud based network. The system comprises a content storage provider, a first communication device and a second communication device in communication with an application server, a content storage provided in the first communication device and a client application provided in the first communication device and the second communication device. The client application provided on the first communication device is adapted to extract content from the content storage, obtain content sharing information from the content storage provider, transmit a content distribution list and a content usage policy to the application server, encrypt the content and create a secure content file. The client application provided on the second communication device is adapted to decrypt the secure content file, find the content usage policy from the content file, find the content sharing information, obtain an updated content usage policy from the application server, authenticate the content recipient using at least one of an authentication mechanism of the content storage provider and an authentication mechanism specified in the content usage policy, verify the identity of the content recipient through the identity resolution mechanism, render the secure content file on the second communication device and enforce the file usage policy based on a time and a location.

The content storage provider herein is at least one of a device content storage or a network cloud storage.

FIG. 1 is an environmental diagram illustrating a system for securing shared data, according to an embodiment herein.

The system comprises an online data storage provider 101 such as a network cloud storage provider, a first communication device 102 and a second communication device 103 in communication with an application server 104, a content storage 105 provided in the first communication device 102, a client application 106 provided on the first communication device 102 and on the second communication device 103.

Here the first communication device 102 is a sender device and the second communication device 103 is a recipient device.

According to FIG. 1, the client application 106 on the sender device drags the content indicated by the arrow 101a from the content storage 105 in the first communication device 102. The client application 106 then obtains content sharing information as indicated by the arrow 101b from the content storage provider 101 and transmits a content distribution list and content distribution policy to the application server 104 as indicated by the arrow 101c. The client application 106 then encrypts the content along with the content usage policy embedded therein and creates a secure content file.

The client application 106 then provides the secure content file to the online data storage provider 101 as indicated by the arrow 101d which then render the secure content file to the second communication device 103 as indicated by the arrow 101e. The recipient authenticates himself using an authentication mechanism to open the file. The client application 106 is then launched on the second communication device 103. The client application 106 then verifies the identity of the recipient by communicating with an identity resolution mechanism as indicated by the arrow 101f. The client application 106 running on the recipient device then opens the content file and enforces the content usage policy. The client application 106 further logs to the application server to check if there is any change in the content file usage policy as indicated by the arrow 101g. If there is any change in the content file usage policy, the client application 106 enforces an updated content usage policy on the content file after the content file is retrieved from the content storage provider 101 as indicated by the arrow 101h.

The encryption herein uses an automated key encryption technique, which uses a symmetric key encryption with any of the standard encryption techniques such as AES encryption. The content storage 105 comprises content extracted from at least one of emails, pictures, content from messages and the like. The cloud storage provider is such as but not limited to Google Drive, Microsoft's Skydrive, Box, Dropbox and the like. The client application 106 provided in the sender device and the recipient device is adapted to integrate with the cloud storage providers 105.

According to FIG. 1, all the communication between the first communication device 102, the second communication device 103, content storage provider 101 and the application server 104 are performed through a communication network 108.

According to another embodiment herein, the first client application 106 is adapted for automatically downloading the content from the network based cloud content storage provider 101 as indicated by the arrow 101i. The downloaded content is then stored in the content storage 105 in the first communication device 102.

Figure 2:
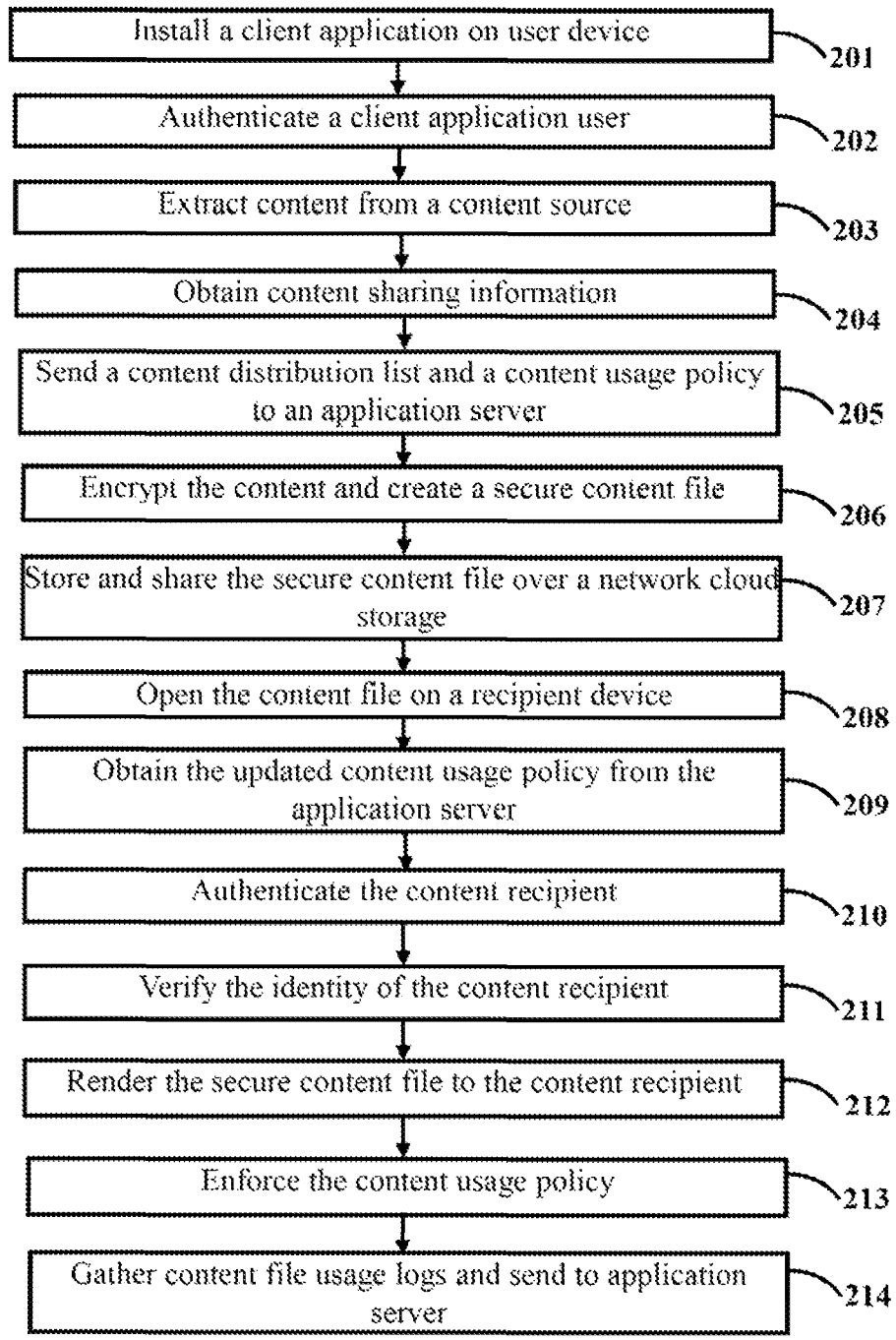
FIG. 2 is a flow diagram illustrating a method for securing shared data, according to an embodiment herein.

FIG. 2 is a flow diagram illustrating a method for securing shared data according to an embodiment herein. The method comprising steps of installing a client application on a user device (201), authenticating a client application user (202), extracting content from a data source (203), obtaining content sharing information from a content storage provider (204), sending a content distribution list and a content usage policy to an application server (205), encrypting the content by the client application and creating a secure content file (206), storing and sharing the secure content file over a network cloud storage (207), decrypting the content file on the content recipient device (208), obtaining an updated content usage policy from the application server (209), authenticating a content recipient using at least one of an authentication mechanism of the content storage provider and an authentication mechanism specified in the content usage policy (210), identifying the content recipient using an identity resolution mechanism (211), rendering the content file to the content recipient (212), enforcing the content usage policy (213) and sending content usage logs to the application server (214).

The method further comprising the steps of enforcing the content usage policy after the content file is dragged from the cloud storage provider and enforcing an updated content usage policy on the content file after the content file is dragged from the cloud storage provider when there is a change in the content file usage policy.

The secure content file provides security for files stored or shared on cloud, security for files extracted from applications, security for documents mailed through email, security for documents and reports generated or downloaded from enterprise applications, security for enterprise documents residing in BYOD (Bring Your Own Device) and security for documents stored and shared through cloud storage providers. Further the secure content file wraps any native content with layered encryption with embedded policies controlling time, location and usage.

The content is retrieved from a plurality of content sources such as but not limited to emails, pictures, content from messages and the like. The content is dragged from content source or cloud storage to the client application for encrypting and sharing. The data sharing enables one click move to cloud storage of content files, where the content is automatically encrypted without having a user to provide a password, a private key, a public key or a key store for the files. The data sharing is provided across file formats, application/platforms and other authentication sources.

The content is encrypted by the client application using at least one of an AES 256 encryption algorithm or any NSA standardized encryption algorithm.

The encryption process of the method involves automatic key management (AKM). In AKM, the cryptographic keys are neither shared nor transported to avoid key leakage threat. The keys are created on the fly and the keys are recomputed automatically at the recipient side for decryption.

The embodiments herein provide a collection of applications, processes and methods to persistently secure documents on the cloud and make them available only with intended users while continually protecting information. Further the embodiments provide a collection of applications, processes and methods for third party data storage providers to securely deliver content to consumers while persistently protecting information.

The embodiments herein provide a method and system for securing shared data herein provides data security by per-file automated encryption. Since the automatic key management is used there is no threat of leakage of cryptographic keys used for encryption/decryption. The method and system further provides the sender an ability to recall or expire shared data. Thus the data can be shared with intended recipients with lifetime control over the data. The owner is able to track, monitor and dynamically control shared data. The proposed technique reduces security gaps of data storage providers.

The SMS/MMS/emails/files can be controlled after sharing with the recipients using the method described here.

The embodiments herein find its application in a various fields. In perspective of the consumers, the users can share photos and documents only with intended friends and family members, send secure SMS, secure voice mails and secure hand notes. The doctors can share insurance claim documents and medical transcription audio files with service providers. The files are encrypted and are in HIPAA compliance. The lawyers can share documents only with intended clients, expire the documents after a duration and can have proof of delivery and consumption. For enterprises, the embodiments enable users to store documents on the cloud without having to worry about key management or encryption or risk of public cloud storage.

Although the embodiments herein are described with various specific embodiments, it will be obvious for a person skilled in the art to practice the embodiments herein with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

We claim:

1. A method for content sharing over a cloud based storage network, said method comprising the following steps:
   authenticating a content sender using an authentication mechanism provided by the cloud based storage network, thereby obviating the need for an identity management scheme at the content sender end;
   selecting, from a content storage, the content to be transmitted to at least one content recipient;
   encrypting the selected content and creating a wrapper file that encapsulates the selected content and the content usage policy corresponding to the selected content;
   querying the cloud based storage network for a distribution list corresponding to the selected content, wherein the distribution list comprises the information corresponding to content recipient(s);
   analyzing the content usage policy embedded in the wrapper file;
   uploading the wrapper file onto the cloud storage based network and initiating the transfer of the wrapper file to the intended contended recipient(s);
   authenticating the content recipient(s) using the authentication mechanism provided by the cloud based storage network, thereby obviating the need for an identity management scheme at the content recipient end, wherein the identity of the content recipient is verified using an identity resolution mechanism;
   decrypting the wrapper file, subsequent to successful authentication of the content recipient(s), and enforcing the content usage policy on the decrypted wrapper file; and
   providing the content recipient(s) with access to the decrypted wrapper hie, based on the content usage policy.

2. The method of claim 1, further comprising the following steps:
   enforcing the content usage policy after the decrypted wrapper file is retrieved from the cloud based storage network; and
   selectively enforcing a modified content usage policy on the decrypted wrapper file after the decrypted wrapper file is retrieved from the cloud based storage network, in the event that the content usage policy has been modified.

3. The method as claimed in claim 1, wherein the selected content is encrypted using at least one of an AES 256 encryption algorithm and an NSA Standard encryption algorithm.

4. The method as claimed in claim 1, wherein the secure content file wraps digital content of any MIME type with layered encryption and with embedded policies controlling time, location and usage of the content.

5. A system for providing secured content sharing, said system comprising:
- a cloud based storage network accessible via an application server;
- a first communication device accessible to a content sender and a second communication device accessible to a content recipient, said first communication device and said second communication device in communication with the application server, said application server configured to authenticate the content sender using an authentication mechanism provided by the cloud based storage network, thereby obviating the need for a key management scheme at the content sender end;
- wherein, said first communication device is adapted to:
  - select data from the content storage, for transmission and sharing;
  - query the cloud based storage network for a distribution list comprising the information corresponding to content recipient(s);
  - encrypt the content, and create a wrapper file that encapsulates the selected content and at least the content usage policy corresponding to the selected content;
- wherein, the second communication device is adapted to:
  - authenticate the content recipient using the authentication mechanism provided, by the cloud based storage network, thereby obviating the need for a key management scheme at the content recipient end, said second communication device further adapted to verify the identity of the content recipient, using an identity resolution mechanism;
  - decrypt the secure content file, post successful authentication of the content recipient;
  - analyze the content usage policy embedded in the wrapper file;
  - render the decrypted wrapper file onto the second communication device, based on the content usage policy.

6. The system as claimed in claim 5, wherein said second communication device is further configured to query said cloud based storage network to selectively obtain a modified content usage policy, said second communication device still further configured to selectively implement said modified content usage policy prior to rendering said secure content file.

* * * * *